June 30, 1959 D. F. SKLAR 2,892,344
CONVERTIBLE HARDNESS TESTERS
Filed Nov. 14, 1952 2 Sheets-Sheet 2
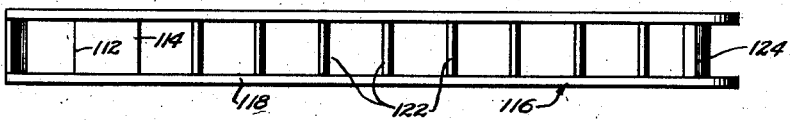
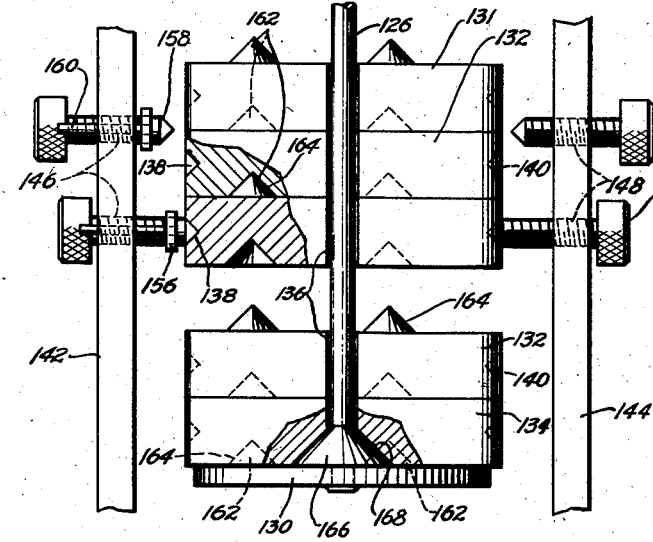
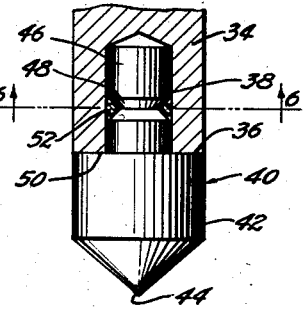
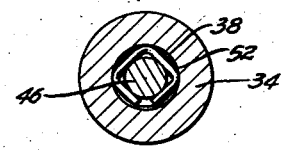
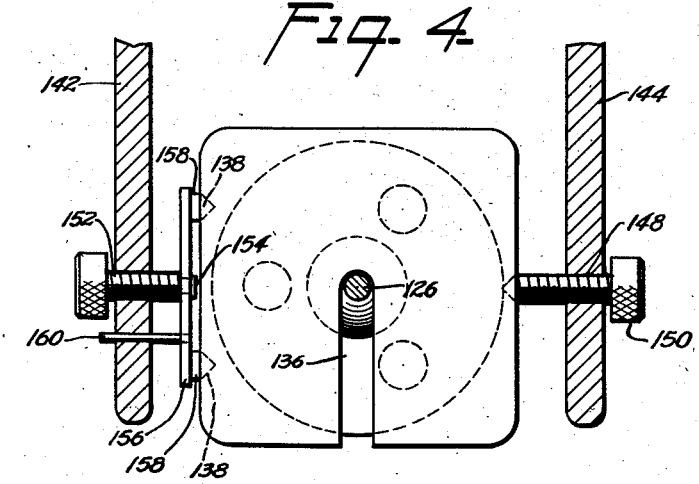
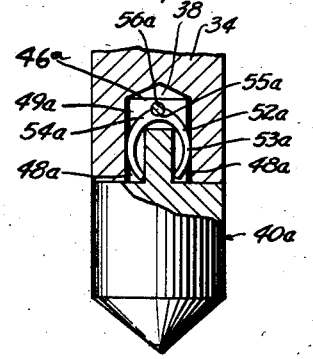
INVENTOR.
DAVID F. SKLAR
BY
ATTORNEY.

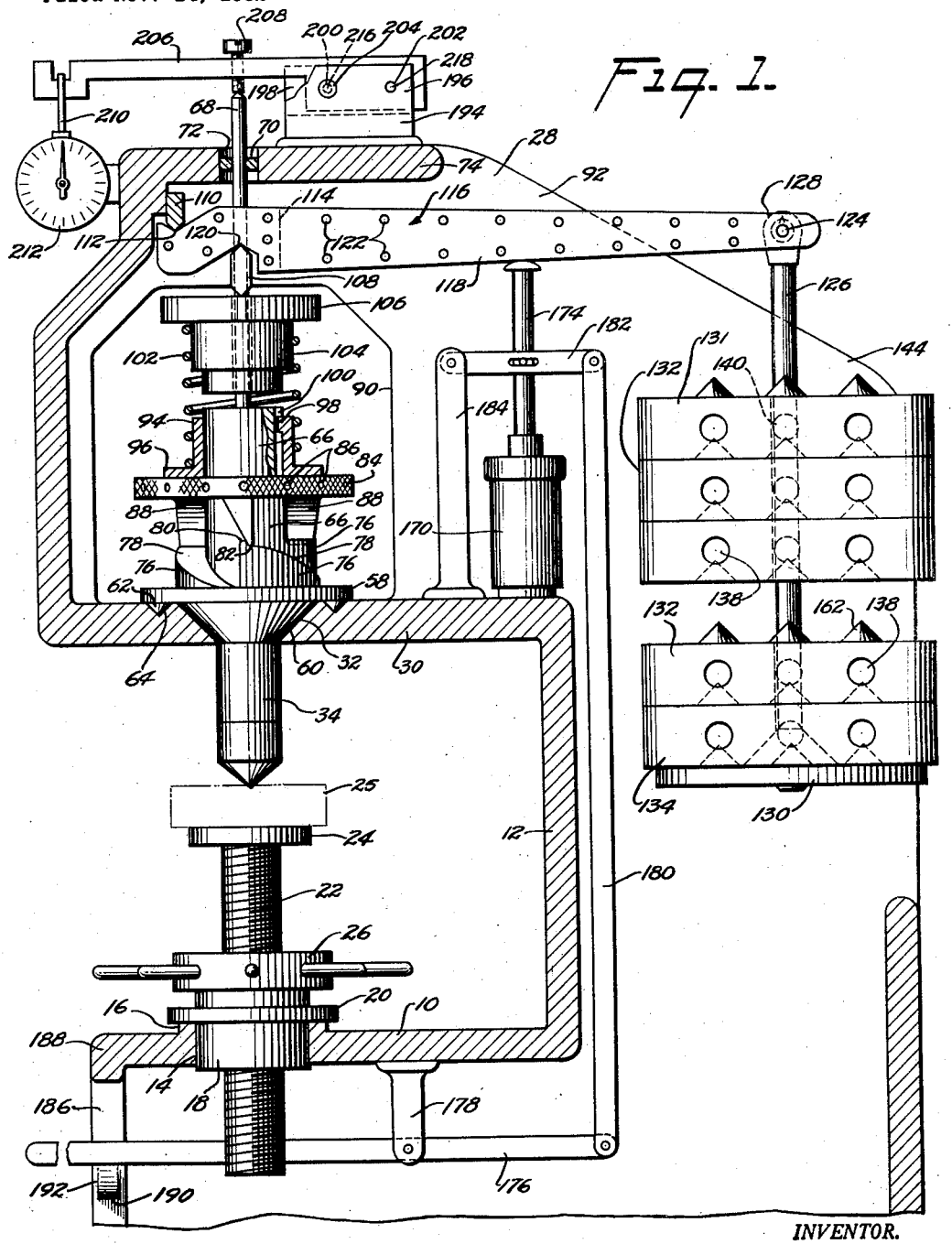

United States Patent Office 2,892,344
Patented June 30, 1959

2,892,344

CONVERTIBLE HARDNESS TESTERS

David F. Sklar, Kent Cliffs, N.Y., assignor to The Torsion Balance Company, Clifton, N.J., a corporation of New York Application November 14, 1952, Serial No. 320,466

20 Claims. (Cl. 73—83)

This invention relates to machines or apparatus for testing the hardness of articles, parts or the like of metal or other material and more particularly to hardness testers of the general type shown in the United States Patents Nos. 1,516,207 and 1,516,208 issued November 18, 1924, to S. P. Rockwell, and to my United States patent application Serial Number 246,376, filed September 13, 1951, having means for successively applied major and minor loads to the penetrator or indenter which indents the test piece being tested; though it is noted that the invention in many of the claims is not limited to machines of this particular type.

Objects of the invention are to provide an improved machine or apparatus of this kind having a minor load spring which is easily and quickly adjustable for either superficial testing or regular testing.

Heretofore separate testers of the above type were used for regular and superficial testing. The cast steel or other type of beam used for applying the major load for regular testing was too heavy and applied too much pressure to the indenter for superficial testing. On the other hand, the light weight beam used for superficial testing was not strong enough for the pressures required for regular testing.

The nitriding process for the surface hardening of steel called for a tester (the superficial tester) capable of measuring the hardness of the surface itself, not the hardness of a thick layer. The regular Rockwell hardness tester, which may have a major load on the indenter up to 150 kg. penetrates much too deeply for superficial testing.

The big difference between superficial and regular testing is in the loading and sensitivity. The initial or minor load on the indenter in superficial testing is 3 kilograms or thereabout, and the major load may be 15, 30 or 45 kilograms, depending upon the thickness in case hardening; while in regular testing the minor load is 10 kilograms or thereabout, and the major load may be 60, 100 or 150 kilograms.

Whereas in regular testing hardened tool steel is penetrated to the depth of about 0.0035 inch on a regular Rockwell "C" scale test, the superficial test will, on metal of the same hardness and with the customary 30 kg. major load, penetrate to only about 0.0010 inch in depth.

The power beam, hanger rod and weight pan of machines heretofore in use for regular testing, strong enough for the 150-kg. major load for regular testing are so heavy, even with all weights removed, that they exert much more pressure on the indenter than the 15 kg. or 30 kg. that may be required for superficial testing; while the power beams of superficial testers heretofore in use which must be light, so as not to exert too much pressure on the indenter during the minor load, are not strong enough for the 150 kg. pressure on the indenter which may be required for regular testing.

Therefore, I show herein and in said application a fabricated beam which will not exert too much pressure on the indenter for superficial testing, but will be able to exert sufficient pressure for regular testing.

A further object of the invention is to provide a special ratio-changing connection between the indenter and the indicator pointer of the dial gauge adapting the gauge for both superficial and regular testing.

Other objects of the invention are to provide special means for selectively applying and removing load weights to and from the beam, and to provide improved means for securing the indenter or penetrator in its supporting plunger without a chance of inaccuracy.

Other objects of the invention are the elimination of need for two load springs and to provide means for quickly adjusting the minor load spring for either superficial or regular testing.

Additional objects of the invention are to effect simplicity and efficiency in such testers and to provide an extremely simple tester of this kind which is easy to operate and is rapid, durable, reliable and adaptable in operation for testing various materials, and is economical to manufacture.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with a hardness tester having an elevating post and an arm having a seat over said post in which is disposed a plunger passing through said seat and having a lower axial bore detachably receiving a shank of a chuck having a lower indenter point. The plunger includes a flange on said seat, a loading rod projecting upwardly from the arm, a lower follower collar adjustably slidable on the plunger, a minor load spring pressing on said collar, and an upper collar resting on the spring. An important feature is a means to adjust the lower collar to upper and lower positions to adjust the spring for superficial or regular testing.

A major load beam fulcrumed in the arm presses on a double knife edge pressing on the upper collar and carries a hanger rod having a lower pan and receiving major load weights on said rod. Improved means are provided to selectively hold weights from the pan.

A bracket on the arm is provided with pivot holes in which a pivot pin is insertable in either of said holes and in apertures in a lever resting on the loading rod and connected to a gauge whereby the effective length of the lever may be changed to adapt the indicator for superficial or regular testing.

In the accompanying drawing showing, by way of example, two of many possible embodiments of the invention, Fig. 1 is a longitudinal vertical sectional view, partly in elevation, showing the tester;

Fig. 2 is a plan of the beam;

Fig. 3 is a fragmental rear elevation, partly in vertical section, of part of the tester, showing the major load weight selecting means;

Fig. 4 is a plan partly in longitudinal section, showing the weight selecting means;

Fig. 5 is a vertical sectional view, partly in elevation, showing the indenter chuck attachment to the plunger;

Fig. 6 shows a horizontal section through the plunger and chuck of Fig. 5;

Fig. 7 is a view similar to Fig. 5 of another form of chuck.

The various parts of my improved tester are carried on an elongated hollow base 10 having a hollow rearwardly open standard 12 on its rear end and having near the front end an axially vertical opening 14 surrounded by a boss 16 and receiving fast therein a bearing bushing 18 having at its upper part a flange 20 resting on the boss and receiving a threaded elevating post 22 vertically slidable in said bushing and provided at the top with a test piece support 24 for the test piece 25. An internally threaded hand wheel 26 resting on the bushing and rotatively received on the post is provided with internal threads engageable with the threads of the post for raising the post as the wheel rotates.

A hollow arm 28 upwardly open at its rear part is mounted on said standard over said base and has a bottom wall 30 provided near the front end with an upwardly facing conical seat 32 axially alined with said post. A plunger 34 passing through said seat over the test-piece support has a lower flat face 36 (Fig. 5) accurately perpendicular to the axis and path of movement of the plunger, said plunger having in its lower part an axial bore 38 perpendicular to and intersecting said face. A penetrator chuck 40 comprising a penetrator chuck body 42 having a lower indenter point or ball 44 has an upper cylindrical shank 46 in said bore provided therearound with an annular groove 48 of triangular cross section. Said body 42 has an upper face 50 accurately perpendicular to the axis of the plunger and engageable flat against said lower flat face 36 of the body with an accurate fit.

A split ring 52 of round cross section and of substantially square shape, or round, slightly oval or slightly triangular shape is seated in said groove and yieldably engages the side face of the groove and of said bore 38 to yieldably hold the shank in the bore.

Fig. 7 shows a modified form of penetrator chuck 40a having an upper cylindrical shank 46a fitting in the bore 38 of the plunger and provided with diametrically opposite longitudinal slots 48a and a deep transverse slot 49a connecting the upper end parts of the longitudinal slots 48a and receiving a horseshoe shaped spring 52a having in said longitudinal slots outwardly curved arms 53a intermediately frictionally engaging the wall of the bore, the yoke part 54a of the spring having an upwardly opening transverse groove 55a in which engages a pin 56a passing diametrically through the plunger and bore and received in said groove for holding the springs in the slots, the spring 52a serving to frictionally hold the shank in the bore.

The mid part of the plunger 34 is provided therearound with a flange 58 having a conical lower face 60 resting on said seat 32. Said flange is provided with conical projections 62 engageable in conical recesses 64 in the bottom wall to prevent the plunger from turning. Said plunger comprises an intermediate cylindrical body 66 and an upper loading rod 68 coaxial with the seat and projecting through a guiding ring 70 in the opening 72 in the top wall 74 of the arm. The upper face of said flange is provided with a suitable number of cam lugs 76 equally spaced around the flange adjacent to the body and each having a long ramp portion 78 an upper stop projection 80 and a notch 82 between the stop projection and ram portion. A conversion follower collar 84 slidable on said body 66 and having a knurled periphery is provided with peripheral spanner receiving holes 86 and with equally spaced downwardly projecting follower lugs 88 engageable with the respective ramp portions. On rotation of the collar 84 by a spanner passed through large openings 90 in the side walls 92 of the arm and engageable in said holes, said lugs 88 are adapted to ride from the bottom of the ramp to said notches 82, thereby to provide upper and lower adjusted positions for the collar 84.

A lower seating collar 94 or bushing slidable on said body is provided with a lower flange 96 resting on the follower collar 84 and with an inner lug 98 engageable in a vertical key seat 100 on the body to prevent rotation of the lower seating collar on the body. A helical minor load spring 102 around the body and resting on said lower flange 96 receives at its upper end an upper seating collar 104 slidably received on the loading rod 68 and slightly spaced above said body 66 to form a minor load gap and having an upper flange 106 resting on the spring.

Said spring 102 is of such length and strength that when the conversion collar 84 is in lower position, the spring is less compressed and exerts less pressure and is adapted to exert a pressure on the indenter of about 3 kg. for superficial testing, and when the collar 84 is in upper position the spring is more compressed and adapted to exert a pressure of about 10 kg. for regular testing.

A tubular double knife edge member 108 surrounding the rod has a lower knife edge resting on the upper seating collar 104.

A downwardly pointed fixed knife edge 110 mounted on the inner upper part of the front end wall of the arm transverse to the arm near and off-set from the loading rod, is engaged by an upper fulcrum seat 112 in a block 114 of a light weight fabricated beam 116 (Fig. 2) extending longitudinally substantially from end to end of the arm. Said beam comprises side plates 118 (Fig. 2) with said block 114 secured therebetween and having said upper seat 112 and a lower seat 120 (Fig. 1) receiving the upper edge of said tubular member 108. The side plates may be of aluminum or other metal and are connected by transverse rivets 122, and at the free ends by an upwardly pointed knife edge pin 124. This beam is strong enough to exert a pressure of as much as 150 kg. on the indenter for regular testing, but is light enough when weights are removed from the pan 130 to exert a pressure on the indenter of less than 15 kg. and is adapted for superficial testing.

A hanger rod 126 having an upper ring 128 suspended on said knife edge pin has a lower pan 130 on its lower end adapted to support one or more of a set of major load weights 131, 132, 134 on said rod, each provided with a radial slot 136, receiving the hanger rod, the lowest weight 134 resting on said pan. Each weight except the bottom weight is provided in one peripheral face with a pair of widely spaced conical recesses 138 and diametrically opposite to a point midway between said recesses with a single conical peripheral recess 140, all recesses being adjacent to adjacent side walls 142, 144 of the standard 12.

Said side walls are provided, at different levels above the operating position of the next to the lowest weight, with tapped holes 146, 148, with which said recesses 140 may be alined.

Pointed knurled headed set screws 150 in the holes adjacent to and alined with the single recesses 140 have inner pointed ends adapted to engage in, and disengage from, said single recesses. Screws 152 in the holes 146 adjacent to and alined with said points, having reduced headed inner ends 154 (Fig. 4) on each of which is received an aperture of a flat yoke 156 carrying at its ends conical projections 158 engageable in said spaced recesses 138.

Guide pins 160 on each yoke and passing through apertures in the side wall prevent the yoke from turning.

A selected number of weights may by manipulation of the screws be held above the weights or weight below, and thus held from the hanger rod, whereby the major load may be adjusted for different conditions or for superficial or regular testing.

The pan 130 and each weight is provided on its top face with a set of conical projections or tips 162 equal angles apart around the rod and nesting in conical recesses 164 in the weight next above, whereby the weights may be stacked and held in registration, and held in position to bring their recesses 138 and 140 in alinement with the projections 158 and the screws 150.

The lower end of the hanger rod 126 is surrounded by a conical bushing 166 fast on the rod and pan 130 in which is received a conical recess or seat 168 in the lower weight 134 whereby said lower weight and all the weights when nested above it are held spaced from the hanger rod, whereby when weights are supported by the set screws 150 and conical projections 158, they will be held out of contact with the rod, if the projections 162 on the pan should be omitted.

The conical bushings 166 being larger than the projections 162 on the pan, serve to center the weights and help to bring the recesses 164 into registration with the tips 162 of the pan.

A dash pot 170 mounted in the floor of said arm below the beam is provided with a vertical cylindrical chamber closed at both ends, a piston therein and a piston rod 174 projecting upwardly from the dash pot and engageable under the beam 116. A load lifting lever 176 intermediately fulcrumed on a bracket 178 in the base is connected by a link 180 to a short lever 182 pivoted to the piston rod and fulcrumed on a bracket 184 mounted on the arm bottom, the load lifting lever 176 being extended and projected frontwardly through a vertical slot 186 in the front wall 188 of the base. The projecting end of the lifting lever may be depressed, whereby said beam is raised to lift the major load from the penetrator. The depressed lever may be caught under the lower shoulder 190 of a cam lug 192 on the side wall of the slot thereby to hold the beam raised.

A pivot fulcrum bracket 194 mounted on the top wall of the arm comprises a pair of spaced walls 196, 198 longitudinal to the arm and provided with pairs of alined pivot pin holes 200, 202 either of which pairs may receive a headed pivot pin 204 on which is fulcrumed a gauge control lever 206 having its rear part between said spaced walls and its mid part provided intermediately with a set screw 208 resting on the loading rod 68. The lever 206 has its front end connected to the upwardly pointing operating spindle 210 of an indicating dial 212 mounted on a bracket on the front wall of the arm. The rear end part of the lever has a pair of bearing apertures 216, 218 alined with said holes of the bracket and disposed distances from the set screw 208 respectively equal to one half of the distance or the whole distance between the set screw and the operating spindle, whereby said pivot pin 204 may be inserted in either of said sets of holes to adapt the operating ratio of the gauge for normal or superficial testing.

The operation of the tester will be understood from the foregoing by those skilled in the testing art and now need be only summarized as follows:

The pin 204 is placed in the aperture 216 for superficial testing or the aperture 218 for regular testing. The number of major load weights 132, 134 at the bottom of the stack that are to be used are allowed to remain free, while the lowest weight of the weights above is secured above the active weights by means of the screws 150 and projections 158, and are thus not applied to the hanger rod.

For superficial testing a larger number of weights are held raised by the screws 150, 152, and a smaller number or none will be so held for regular testing. The follower collar is turned to raise it to upper position for regular testing or to lower position for superficial testing.

Then starting with the elevating post lowered and the lifting lever 176 latched to hold the major load weights from the hanger rod, the test piece 25 is placed on the support 24, the hand wheel 26 is turned to press the test piece against and raise the indenter causing the plunger 34 to be slightly raised, slightly closing the minor load gap, causing a minor load indentation and movement of the pointer of the gauge dial thereby to indicate the proper minor load position of the pointer. The latched weight lifting lever 176 supports the selected major beam and major load weights free of the plunger permitting free movement of the plunger under influence of the minor load spring. The gauge dial may be rotated to zeroize the dial at the minor load position of the pointer.

Then the weight lifting lever 176 is unlatched allowing the major load weights on the pan 130 to cause the beam to press on the tubular knife edge 108, whereupon the major load weights sink slowly as retarded by the dashpot, and the selected major load weights are applied to the plunger, thereby pressing the indenter further into the test specimen.

When the major load weights have pressed the indenter into the specimen as far as the hardness of the material will permit thereby forming the major load indentations, the handle end of the lifting lever 176 is lowered and latched, thereby lifting the major load weights and beam from the indenter. This leaves the indenter still in the indentation, and the difference in position of the indenter in the major load indentation as compared with the indenter position in the minor load indentation will represent the change of depth from minor load to major load indentation, which will in turn be indicated on the dial gauge.

This completes the test. The elevating post is then lowered leaving the tester ready for another test.

I claim as my invention:

1. In combination, an elongated hollow base having a hollow rearwardly open standard on its rear end and having near the front end an axially vertically opening surrounded by a boss; a bearing bushing in said opening having at its upper part a flange resting on the boss; a threaded elevating post vertically slidable in said bushing and provided at the top with a test piece support; an internally threaded hand wheel resting on the bushing and rotatively received on the post and provided with internal threads engageable with the threads of the post for raising the post as the wheel rotates; a hollow arm upwardly open at its rear part mounted on said standard over said base and having a bottom wall provided at the front end with an upwardly facing conical seat axially alined with said post and conical recesses adjacent to the seat; a plunger passing through and resting on said seat and having an indenter point at the lower end and a flange on said bottom wall; said flange having cams thereon; a lower collar on said plunger having lower projections engaging said cams; a minor load spring pressing on said collar; a major load means adapted to press on the plunger when the plunger is raised; and a gauge connected to the plunger; said flange having conical projections engageable in said recesses to prevent the plunger from turning.

2. In combination, an elevating post; a seat over said post; a plunger passing through said seat and having an indenter point at the lower end, a flange over said seat, an intermediate cylindrical body and a loading rod above said body said body having a vertical key seat; the upper face of the flange being provided with three cam lugs equally spaced around the flange adjacent to the body and each having a long ramp portion an upper stop projection and a notch between the stop and ramp portion; a follower conversion collar slidable on said body and having a knurled periphery provided with peripheral spanner receiving holes and with equally spaced downwardly projecting follower lugs engageable with the ramp portions on rotation of the collar by a spanner engageable in said holes, and adapted to ride from the bottom of the ramp to said notches; thereby to provide upper and lower adjusted positions for the collar; a lower seating collar or bushing slidable on said body and provided with a lower flange resting on the follower collar, and with an inner lug engageable in said vertical key seat of the body to prevent rotation of the lower seating collar on the body; a helical minor load spring around the body and pressing on said lower flange; a major load means adapted to press on said body when raised; and a gauge connected to the plunger.

3. In combination, a base having a front wall having a vertical slot therein and a downwardly facing shoulder at the side of the slot; a standard on the rear of the base; an elevating post mounted on said base near said wall; an arm on said standard having a bottom wall having a seat over said post; a plunger passing through said seat and having an indenter point at the lower end; a minor load spring pressing on said plunger; a major load beam fulcrumed in the arm for pressing the plunger when the plunger is raised; a dash pot mounted on the bottom wall of said arm below the beam and comprising a vertical cylinder closed at both ends, a piston therein and a piston rod projecting upwardly from the dash pot and engaging under the beam; a short lever pivoted to the piston rod and to said arm; a link in said standard; a load lifting lever intermediately fulcrumed in the base and connected by said link to said short lever, the lifting lever being extended forwardly through the said slot and engageable with said shoulder and projecting frontward of the base; whereby said beam may be raised to lift the major load from the penetrator; and a gauge connected to the plunger.

4. In a hardness tester, in combination, a base; a standard on the base; an elevating post mounted on said base; an arm on said standard having a top wall and a bottom wall having a seat over said post; a plunger passing through said seat and having an upper loading rod and a lower penetrator; a minor load spring calibrated to exert, in a first compressed position, a minor load equal to the minor load required for superficial hardness testing and to exert, in a second and more compressed position, a greater minor load equal to the minor load required for regular hardness testing; means mounting said minor load spring on said plunger; and means engaging said spring operative selectively to adjust said spring to said first compressed position to exert said minor load for superficial hardness testing and to said second more compressed position to exert said greater minor load for regular hardness testing; a pivot bracket mounted on the top wall of the arm and comprising a pair of spaced walls longitudinal to the arm and provided with pairs of alined transverse pivot pin holes; a gauge control lever having its mid part provided intermediately with a set screw resting on the loading rod; a bracket on the front of the arm and carrying an indicating dial gauge having an upwardly pointing operating spindle connected to the free end of the lever; the rear end part of the lever having a pair of bearing apertures alined with said holes of the bracket and disposed a distance from the set screw equal to about one half of the distance or the whole distance, between the set screw and the operating spindle; whereby a pivot pin may be inserted in either of said sets of holes to adapt the operating ratio of the gauge for regular or superficial testing.

5. A hardness tester suitable for both superficial and regular testing comprising, in combination, a specimen support; an indenter; means for effecting relative approach between the support and the indenter; an indicator; actuating means operatively connecting the indenter with the indicator and adjustable discretely to have one operating ratio suitable for regular testing or another operating ratio suitable for superficial testing; means for selectively changing the actuating means from either one of said ratios to the other; a minor load spring calibrated to exert, in a first compressed position, a minor load equal to the minor load required for superficial hardness testing and to exert, in a second and more compressed position, a greater minor load equal to the minor load required for regular hardness testing; means mounting said minor load spring on said plunger; means engaging said spring operative selectively to adjust said spring to said first compressed position to exert said minor load for superficial hardness testing and to said second more compressed position for regular hardness testing; and means for selectively applying to the indenter the proper amount of major load loading means for regular testing and for superficial testing.

6. A hardness tester suitable for both superficial and regular testing comprising, in combination, a specimen support; a plunger carrying an indenter; means for effecting relative approach between the support and the indenter; a beam operatively connected to the plunger; the beam being strong enough for regular testing and light enough for superficial testing; an indicator; actuating means operatively connecting the indenter with the indicator and adjustable discretely to have one operating ratio suitable for regular testing or another operating ratio suitable for superficial testing; means for selectively changing the actuating means from one of said ratios to the other; a minor load spring calibrated to exert, in a first compressed position, a minor load equal to the minor load required for superficial hardness testing and to exert, in a second and more compressed position, a greater minor load equal to the minor load required for regular hardness testing; means mounting said minor load spring on said plunger; and means engaging said spring operative selectively to adjust said spring to said first compressed position to exert said minor load for superficial hardness testing and to said second and more compressed position to exert said greater minor load for regular hardness testing; major load weights supportable by the beam; and means for selectively applying to the beam the proper amount of said weights for regular and superficial testing.

7. In a hardness tester, in combination, a hollow base having a vertical slot in its front end; a hollow standard on the base; an elevating post mounted on the front end part of said base; a hollow arm on said standard having a bottom wall having a seat over said post; a plunger passing through said seat and having an indicator point at the lower end; a gauge connected to the plunger; a minor load spring pressing on said plunger; a major load beam fulcrumed in the arm for pressing on the plunger; a dash pot in the arm on said bottom wall having a piston rod engaging the lower face of the beam; and a beam lifting means comprising a bracket on said bottom wall, a short lever in the arm pivoted to said bracket and piston rod, a lifting lever intermediately fulcrumed in the base and having a handle portion projecting through said slot in the base in convenient position to avoid interference by the operator's arm with vision, and a link in said standard pivoted to said lever; said lifting means except the handle portion being entirely within the tester and free of lateral and rear projections thereby rendering the tester compact.

8. A hardness tester for superficial and regular testing comprising a fulcrum, a beam fulcrumed at one end on the fulcrum; a plunger operatively connected to the beam near the fulcrum and carrying an indenter; a specimen support; means for effecting relative approach between the indenter and specimen support; major load weight supporting means on the free end of the beam; the beam being strong enough to exert a pressure of 150 kg. on the indenter for regular testing, and light enough to exert a pressure on the indenter of less than 15 kg. for superficial testing; a minor load spring calibrated to exert, in a first compressed position, a minor load equal to 3 kg. for superficial hardness testing and to exert, in a second more compressed position, a minor load equal to 10 kg. for regular hardness testing; means mounting said minor load spring on said plunger; and means engaging said spring operative selectively to adjust said spring to said first compressed position to exert said minor load for superficial hardness testing and to said second more compressed position to exert said greater minor load for regular hardness testing.

9. A tester as in claim 8 comprising an indicator; an actuating means including a second beam operatively connecting the plunger with the indicator and having a movable means movable from one position to another to adjust said second beam to have one operating ratio suitable for regular testing and a second operating ratio about twice the regular ratio for superficial testing.

10. A tester as in claim 9 comprising means for positioning and holding said movable means accurately in said positions when moved thereto.

11. A hardness tester for superficial and regular testing comprising a fulcrum, a beam fulcrumed at one end on the fulcrum; a plunger operatively connected to the beam near the fulcrum and carrying an indenter; a specimen support; means for effecting relative approach between the indenter and specimen support; major load weight supporting means on the free end of the beam; the beam being strong enough to exert a pressure of about 150 kg. on the plunger for regular testing, and adapted to exert a pressure on the plunger of less than 15 kg. for superficial testing; a minor load spring pressing said plunger toward said support; said minor load spring calibrated to exert, in a first compressed position, a minor load equal to the minor load required for superficial hardness testing and to exert, in a second and more compressed position, a minor load equal to the minor load required for regular hardness testing, means mounting said minor load spring on said plunger and means engaging said spring operative selectively to adjust said spring to said first compressed position to exert a minor load for superficial hardness testing and to said second more compressed position to exert a minor load for regular hardness testing.

12. A tester as in claim 11 comprising an indicator; an actuating means operatively connecting the plunger with the indicator and having a movable means movable from one position to another to adjust the said actuating means to have one operating ratio suitable for regular testing and a second operating ratio for superficial testing.

13. A tester as in claim 12 comprising means positioning said movable means accurately in each of said positions when moved thereto, and preventing movement toward the other position.

14. A hardness tester adjustable for testing both superficial and regular indentation hardness which comprises in combination, a specimen support; a seat on said support; a plunger passing through said seat and having a lower indenter and a body above said seat; a fulcrum; a major load beam adapted for superficial testing and strong enough for regular testing and fulcrumed at one end on said fulcrum; weight supporting means at the other end of the beam; means for limiting downward movement of the beam; an upper collar disposed above the body; a minor load spring pressing on said plunger toward the test piece and toward said upper collar; means cooperating with the beam to hold the collar normally spaced from said body to provide a minor load gap; means for effecting relative approach between specimen support and the indenter to cause the specimen to engage the indenter and slightly decrease said gap to apply the minor load; said minor load spring being calibrated to exert, in a first compressed position, a force equal to the minor load required for superficial testing and to exert, in a second and more compressed position, a force equal to the minor load required for regular testing, means on said body operative to adjust said spring to said first compressed position for superficial hardness testing without changing the minor load gap, and to adjust said spring to said second more compressed position for regular hardness testing without changing the minor load gap, and separate means engaging said plunger operative to change and adjust said minor load gap.

15. A tester as in claim 14 said pressures of said spring pressing on the plunger with pressures respectively of about 3 kg. for superficial testing, and about 10 kg. for regular testing.

16. A tester as in claim 14 said fulcrum being a downwardly pointing knife edge fulcrum.

17. A tester comprising a specimen support; a seat over said support; a plunger passing through said seat and having a lower indenter, an intermediate body on said seat, and an upwardly pointing loading rod; a major load beam fulcrumed at one end near the loading rod; weight supporting means at the other end of the beam; means for limiting downward movement of the beam; a lower collar slidable on the body; a minor load spring pressing on said collar; an upper collar slidable on the rod and pressing on the spring; a knife-edged member pressed on by the beam and pressing on the upper collar to hold the upper collar normally spaced from said body to provide a minor load gap; means for effecting relative approach between the specimen support and the indenter to cause the specimen to engage the indenter and slightly decrease said gap to apply the minor load and spring adjusting means on the body and accessible from the exterior of the assembled tester to adjust the lower collar relative to the upper collar without changing the minor load gap, to adjust the pressure of the spring, said spring being calibrated to exert, in a first compressed position, a force equal to the minor load required for superficial hardness testing and to exert, in a second and more compressed position, a force equal to the minor load required for regular hardness testing, said spring adjusting means on the body being operative to adjust said spring to said first compressed position for superficial hardness testing and to said second more compressed position for regular hardness testing and separate means engaging said rod operative to adjust said minor load gap.

18. In combination, a specimen support; a seat over said support; a plunger passing through said seat and having a lower indenter, an intermediate body on said seat, and an upwardly pointing loading rod; a major load beam light enough for superficial testing and strong enough for regular testing fulcrumed at one end near the loading rod; weight supporting means at the other end of the beam; means for limiting downward movement of the beam; a lower collar slidably adjustably mounted on the body; an upper collar slidable on the rod; a minor load spring between said collars; and pressing on the body; a double knife edge member pressed on by the beam and pressing on the upper collar to hold the upper collar normally spaced from said body to provide a minor load gap; means for effecting relative approach between specimen support and the indenter to cause the specimen to engage the indenter and slightly decrease said gap to apply the minor load; and means on the body to adjust the lower collar relative to the upper collar without changing the minor load gap, to provide upper and lower positions for the lower collar to change the pressure of the spring to provide minor loads for regular and superficial testing respectively; the strength and construction of said spring being such that when the lower collar is in lower position the spring presses on the plunger with a pressure of about 3 kg. for superficial testing, and when the lower collar is in upper position the spring presses on the plunger with a pressure of about 10 kg. for regular testing.

19. An indentation hardness testing machine for measuring and indicating both superficial and regular hardness wherein the superficial hardness test requires a minor load of 3 kg. and a major load of 30 kg. and wherein the regular hardness test requires a minor load of 10 kg. and major load of 100 kg., said machine comprising in combination, an elevating post; a seat over said post; a plunger passing through said seat and having an upper loading rod, a lower indenter point, an intermediate body on said seat and a flange over the seat; a lower collar on the body over the flange; a minor load spring pressing on said collar calibrated to exert a minor load of 3 kg. in a first compressed position and a minor load of 10 kg. in a second and more compressed position; an upper seating collar slidably received on the rod slightly spaced from said body and having an upper flange resting on the spring; a tubular double knife edge member slidable on the rod and having its lower knife edge resting on the upper seating collar; means between the lower collar and flange for adjusting the lower collar to a first position in which said spring is in said first compressed position exerting a minor load for superficial testing and from said first position to a second position in which said spring is in said second more compressed position exerting a minor load for regular testing; a major load beam fulcrumed at a point and having an arm and pressing on the upper end of said double knife edge member; the upper collar being adapted to press on said body when the body is raised; and a gauge connected to the loading rod for indicating superficial hardness when said spring is adjusted to said first compressed position and regular hardness when said spring is adjusted to said second more compressed position; and separately removable weights on the free end of the beam for adjusting the major load to 30 kg. for superficial hardness testing and to 100 kg. for regular hardness testing.

20. A hardness tester suitable for both superficial and regular hardness testing which comprises in combination a vertically movable plunger having an indenter at its lower end, a specimen support upon which to mount a specimen to be penetrated by said indenter, means for effecting relative approach between said support and said indenter, a helically wound compression spring calibrated to exert, in a first compressed position, a force equal to the minor load required for superficial hardness testing and to exert, in a second more compressed position, a force equal to a minor load required for regular hardness testing, means mounting said helically wound spring on said plunger, means engaging said spring operative selectively to adjust said spring to said first compressed position to exert a minor load required for superficial hardness testing and to said second more compressed position to exert a minor load required for regular hardness testing, means including a fulcrumed beam operative selectively to apply to said indenter the major load required for superficial hardness testing and the greater major load required for regular hardness testing; and means operatively connected to said beam for indicating the amount of penetration of the indenter in a test specimen.

References Cited in the file of this patent

UNITED STATES PATENTS

| | | |
|---|---|---|
| 1,433,163 | Walters | Oct. 24, 1922 |
| 1,634,444 | Benton | July 5, 1927 |
| 2,030,475 | Shore | Feb. 11, 1936 |
| 2,217,089 | Yates | Oct. 8, 1940 |
| 2,241,347 | Hem | May 6, 1941 |
| 2,251,462 | Mueller | Aug. 5, 1941 |
| 2,319,208 | Clark | May 18, 1943 |
| 2,326,759 | Clark | Aug. 17, 1943 |
| 2,333,747 | Sklar | Nov. 9, 1943 |
| 2,362,941 | Sklar | Nov. 14, 1944 |
| 2,382,291 | Carlberg | Aug. 14, 1945 |
| 2,387,242 | Carliss | Oct. 23, 1945 |
| 2,447,282 | Scinta | Aug. 17, 1948 |

FOREIGN PATENTS

| | | |
|---|---|---|
| 269,542 | Great Britain | Aug. 13, 1928 |
| 738,761 | France | Aug. 18, 1932 |
| 657,988 | Germany | Mar. 18, 1938 |
| 239,040 | Switzerland | Dec. 3, 1945 |
| 916,869 | France | Aug. 26, 1946 |